Oct. 23, 1923.

A. C. JEWETT

DRY CELL

Filed July 1, 1920

Inventor
Arthur C. Jewett,
By
Attorney

Oct. 23, 1923.

A. C. JEWETT 1,471,486

DRY CELL

Filed July 1, 1920

Inventor
Arthur C. Jewett
By Harry Richardson
his Attorney

Patented Oct. 23, 1923.

1,471,486

UNITED STATES PATENT OFFICE.

ARTHUR C. JEWETT, OF NEW HAVEN, CONNECTICUT, ASSIGNOR TO WINCHESTER REPEATING ARMS COMPANY, OF NEW HAVEN, CONNECTICUT.

DRY CELL.

Application filed July 1, 1920. Serial No. 393,335.

*To all whom it may concern:*

Be it known that I, ARTHUR C. JEWETT, a citizen of the United States, residing in the city of New Haven, county of New Haven, and State of Connecticut, have invented certain new and useful Improvements in Dry Cells, of which the following is a full, clear, and exact description.

This invention relates to dry cells and more particularly to those in which a body of suitable depolarizing material surrounds the carbon pencil or other central electrode. The invention also has special reference to dry cells of the so-called miniature type, such as used in connection with hand lamps and pocket flash-lights. It is not limited, however, to this particular application.

In galvanic dry cells of the Leclanché type, it has been common practice to enclose the depolarizing mass, body or cartridge in an envelope or cover of bibulous material, usually of cotton fabric such as cheese-cloth. This material is commonly applied to the cartridge in the form of a strip which is folded or wrapped around the cartridge and held in place by threads or the like wound about the cheese-cloth and tied in place. This method of wrapping has serious drawbacks, owing to the fact that the operation is a tedious one requiring considerable experience and skill. The wrapping of the fabric is in itself a somewhat difficult operation and the tying of the string or thread is an additional operation which must follow the wrapping and which usually involves the passing of the thread around the cartridge both transversely and longitudinally a multiplicity of times. The cartridge is usually cylindrical in shape and it is a difficult matter fully and securely to enclose in a wrapping strip a cylindrical object. As a consequence of these conditions the wrapping of the cartridges has been expensive, it has been difficult to obtain the necessary skilled labor, and in many cases the character of the work done has not been satisfactory.

One of the primary objects of the present invention is to overcome these disadvantages and drawbacks. By my invention I provide, among other things, a bibulous or absorbent cartridge wrapper comprising a plurality of closely set threads or strands snugly conforming to the cartridge so that the wrapper fits the latter neatly. The wrapper preferably consists of a plurality of cotton threads or the like that cross each other at an angle and are held under slight tension so as to confine the depolarizing mass securely. These threads may constitute for example, a braided, woven, knit or wound jacket which can be readily applied. The wrapper is preferably formed directly on the cartridge and can be placed on the latter without the objections to which I have referred; and it serves very efficiently in the functioning of the cell. By my invention, also, the wrapping can be done very expeditiously by labor not possessing a high degree of skill, and the cartridges may be wrapped or jacketed in a more secure and uniform manner than heretofore.

By forming the wrapper or jacket directly on the cartridge, a separate operation for positioning a ready-made fabric is obviated, as well as the operation of securing such a wrapper in place. By my invention the cover or jacket automatically conforms to the cartridge so that the former is held on the cartridge with a considerable degree of security and forms in effect an integral part of the cartridge, obviating to a large extent at least the necessity of furnishing additional securing means. When assembled in the cell the cover or jacket of the cartridge is effectively held against displacement or raveling.

To these and other ends the invention consists in the novel features and combinations of parts to be hereinafter described and claimed.

Figure 11:
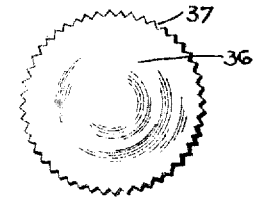
Figure 12:
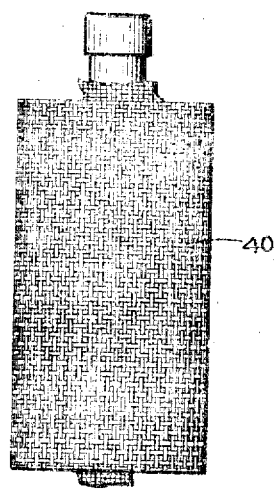
Figure 14:
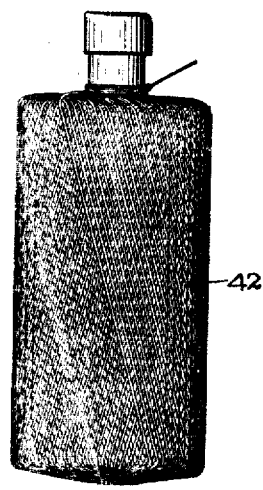
Figure 13:
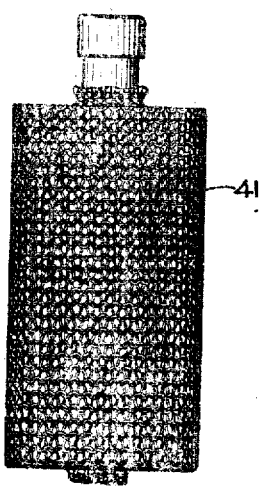
Figure 15:
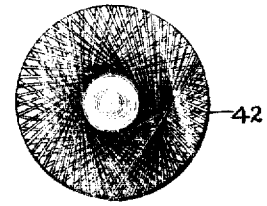
Figure 16:
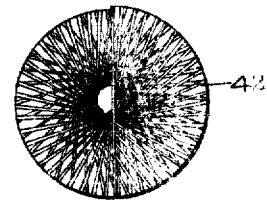

Fig. 11 is a detail of one of the end caps;
Fig. 12 is an elevation of a cartridge having a woven jacket;
Fig. 13 is a similar view of a cartridge having a knit jacket.
Fig. 14 is a similar view of a cartridge having a wound jacket; and
Figs. 15 and 16 are a top and a bottom view respectively of the cartridge shown in Fig. 14.

Figure 1:
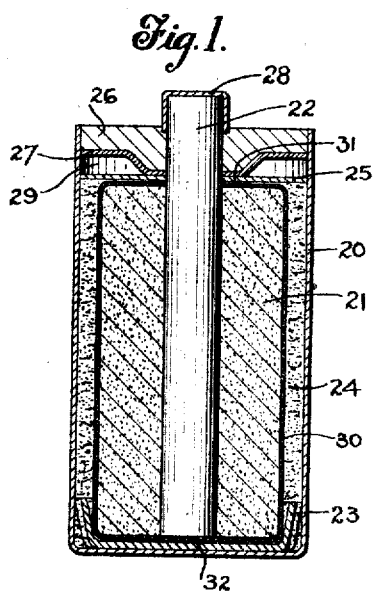
Fig. 1 is a vertical central section of a dry cell embodying my improvements.

In the dry cell shown in Fig. 1, which is of the type commonly employed in connection with hand lamps, the drawn zinc cup 20, which serves as one of the electrodes, contains a cartridge 21 of suitable depolarizing material surrounding a carbon pencil 22 which constitutes the other electrode. In the case illustrated, the body of depolarizing material adheres to the carbon pencil so that the latter forms an integral part of the cartridge 21. The cartridge is of less height than the cup and the pencil extends upwardly out of the cartridge through a suitable top closure for the cell. In the form shown, the cartridge is centered at its lower end within the zinc cup by means of a centering disk 23 which may be conveniently made of paper impregnated with paraffin or the like. A body of paste 24 surrounds the cartridge in the space between the side surface thereof and the side wall of the cup, such paste serving as a carrier or vehicle for the electrolyte. On top of the cartridge and overlying the paste is a paraffin impregnated paper washer 25 having a central opening whereby it is fitted about the upper end of the carbon pencil. The upper end of the cell may be closed in any convenient manner, for example by a pitch seal 26 located within the upper end of the zinc cup on top of a cupped paper washer 27. On top of the carbon pencil is the usual contact cap 28.

The paste 24 preferably extends upwardly approximately to the level of the upper surface of the cartridge and the washer 25 is fitted about the pencil so as to rest against the top of the cartridge. At its periphery the washer overlies the paste and forms a yielding enclosure therefor which may be shifted upwardly somewhat by gas pressure when gas is generated in the cell, so as to allow the gas to pass into the gas space 29 between the upper and lower paper washers.

The cartridge of depolarizing material may consist for example of a mixture of finely divided manganiferous and carbonaceous material moistened with water and containing a certain amount of electrolyte material such as ammonium chlorid. The paste 24 may contain wheat flour, for example, a suitable deliquescent substance such as zinc chlorid, and an amalgamating substance such as mercuric chlorid.

In the form shown in Fig. 1, the cartridge 21 is provided with a tubular fabric cover or jacket, which is so placed on the cartridge that the cover or jacket will be held firmly thereon and form practically an integral part thereof. The jacket, which serves as a substitute for the cheese-cloth wrapper commonly employed, fits the cartridge snugly and conforms to the same, and this may be effected very satisfactorily by braiding the jacket directly onto the cartridge.

Figure 3:
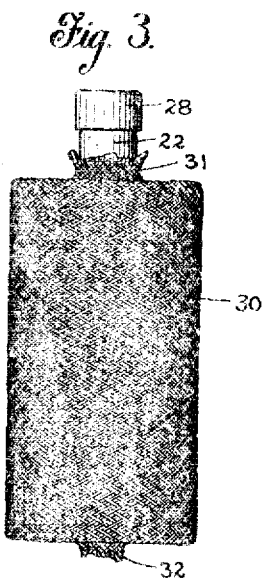
Fig. 3 is a detail elevation of the cartridge as it appears after wrapping.
Figure 2:
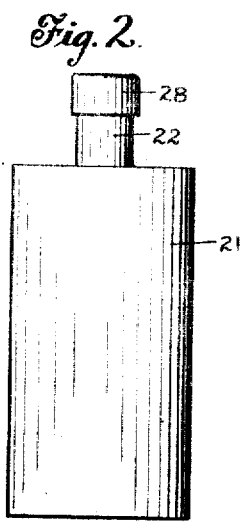
Fig. 2 is a detail elevation of the naked cartridge.
Figure 4:
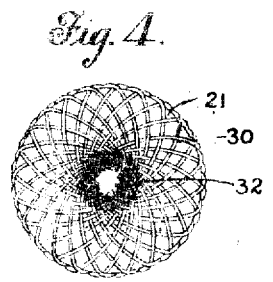
Fig. 4 is a bottom view of the cartridge shown in Fig. 3.

It will be observed from Fig. 3, which shows in detail the cartridge of Fig. 1, that the cartridge is provided with a snug braided jacket 30. This jacket is preferably braided directly on the cartridge. It has a tubular structure with an enlarged portion or body tightly hugging the cylindrical side surface of the cartridge, and with upper and lower end portions conforming respectively to the flat upper and lower end surfaces of the cartridge. At the top, the braided cover extends over the flat face of the cartridge approximately to the upwardly projecting carbon pencil, and initially the braided fabric may have a neck portion 31 extending upwardly more or less around and conforming more or less closely to the carbon pencil, this neck portion 31 being cut off at the top. In the operation of braiding, the threads, which may be the ordinary cotton threads, will be somewhat more closely woven about the pencil at the neck or collar portion 31 than in the body portion of the jacket. The jacket is also open at the central part of the lower end thereof, as indicated at 32. The jacket 30 may be so braided on the cartridge as initially to enclose the whole of the projecting end of the carbon pencil, and to extend considerably beyond the bottom part of the cartridge, likewise, it being subsequently severed along transverse lines so as to form the neck portions 31 and 32. Considerable variation may be made in these and other respects, however, without digressing from the principle of the invention or sacrificing the advantages thereof.

When the cartridge is placed in the dry cell the bottom centering washer 23 is positioned over the lower surface of the cartridge and lies in close contact with the same. The neck portion 32 is thereby somewhat flattened out, the same preferably being of such size that it will flatten out in the space between the bottom of the cartridge and the upper surface of the bottom centering washer without appreciably increasing the total length of the cartridge with the bottom centering washer applied to the same. Of course, the washer 23 may be applied to the cartridge directly after the latter has been jacketed. The washer, which is of cupped shape, conforms closely to the bottom part of the cartridge so as to hug the same and after it has once been positioned thereon there will be no raveling of the threads of the jacket at the lower part thereof. The conditions at the top of the cartridge are somewhat similar, the neck portion 31 of the braided jacket being flattened down and held in a flattened condition by the washer 25 or a similar element which abuts the cartridge at the upper surface of the latter and holds the cartridge in place. It will be obvious that after assemblage of the cell there will be no raveling of the fabric jacket either at the top or bottom, where the only free ends of the threads are located. In other words, the washer 23 maintains the jacket in place at the bottom, and the washer 25 maintains it in place at the top.

Figure 5:
Figs. 5 and 6 are fragmentary elevations of cartridges of somewhat modified form.

In Fig. 5, I have shown a somewhat different form of cartridge, which is tapered at the upper end, as shown at 33. This does away with the abrupt shoulder and hence the change in diameter of the cover is less sudden or abrupt. The cartridge may also be provided at its lower end with a similar beveled or tapered surface (not shown).

Figure 6:
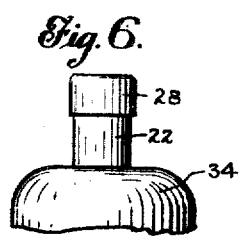

In the form shown in Fig. 6, the end portion of the cartridge is gradually reduced in diameter on a curve, as shown at 34, instead of at an angle.

Figure 7:
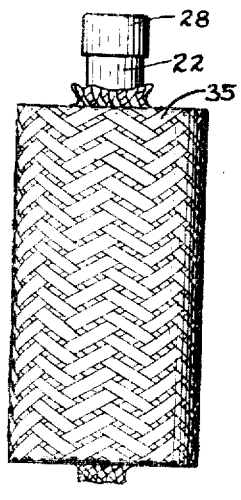
Fig. 7 is an elevation of a cartridge having a cover consisting of braided flat strips or tapes.

In the form shown in Fig. 7, the elements of which the jacket is composed are flat strips or tapes 35 instead of round threads. This is another form of braided jacket. Any suitable tape or ribbon may be employed for this purpose. The interstices of the jacket are about the same size as in the form shown in Fig. 3, but obviously variations may be made in this regard as called for by different conditions.

Figure 8:
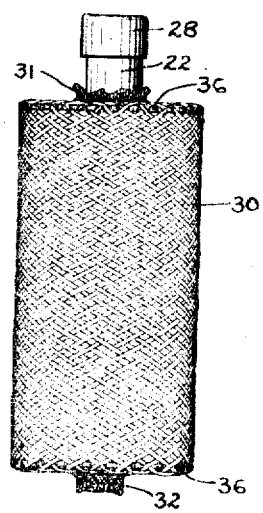
Fig. 8 is an elevation of a cartridge of somewhat modified form.

In the form shown in Fig. 8, braiding is facilitated by providing the cartridge with end caps 36 before the same is braided. These end caps may consist advantageously of paper disks and they may be provided with peripheral indentations 37 which position the elements of the braided cover, as shown.

Figure 9:
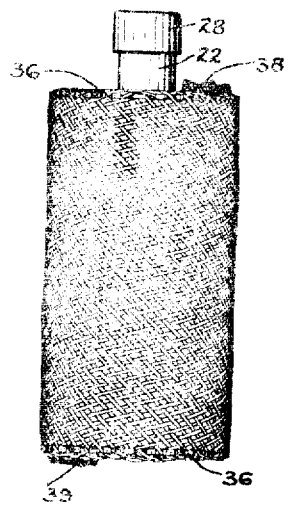
Fig. 9 is an elevation of another form of braided cartridge.
Figure 10:
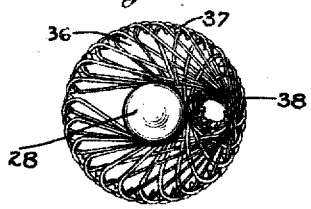
Fig. 10 is a top plan view of the cartridge shown in Fig. 9.

In the form shown in Figs. 9 and 10, the longitudinal axis or center line of the cover is displaced somewhat relatively to the axis of the cartridge. This causes the opening or neck 38 at one end of the cover to be located at one side of the carbon pencil, while the neck 39 at the other end of the cartridge is located at the opposite side of the cartridge axis. In this particular case, end disks 36 similar to those shown in Fig. 8 are employed, but this is not essential. It has been found in practice that it is advantageous to place the cartridge in the braided cover at a slight angle in this manner, because in this case the neck 38 may be more readily flattened down against the top of the cartridge than in the case where such neck is interiorly supported by the carbon pencil. By offsetting the jacket so that the upper neck or extremity thereof is eccentrically located with reference to the electrode, the said neck or extremity may be flattened down so that it takes up practically no more space endwise of the cartridge than is occupied by the other threads or tapes passing over the upper cartridge surface. This particular form (Fig. 9) is also primarily intended for use with washers above and below, respectively, the cartridge, approximately as shown in Fig. 1, but it will be understood that such washers are not necessary in all cases.

It will be understood that in all the forms previously described the tubular braided jacket is placed on the cartridge snugly, the threads being under tension. The braiding tension is such that the threads of the jacket are quite tight and conform closely to the cartridge exterior so as to prevent any appreciable displacement of the depolarizing material if the depolarizing body becomes cracked or chipped. In braiding the cartridge, a thread of No. 20 cotton has been employed with good results. The interstices between the threads on the cylindrical side surface of the cartridge body may be fairly large. Where the cartridge is braided they are rhomboidal in shape, and in braiding a cartridge for a No. 5 cell, the minor axis of the rhomb may be say a scant $\frac{1}{16}$ of an inch, the major axis being a scant $\frac{1}{8}$ of an inch. Good results have been obtained in this way, but various modifications will be found useful. The minor axes of the rhomboidal interstices are in line with the longitudinal cartridge axis except where the cartridge is introduced into the braid at an angle, as explained in connection with Fig. 9.

In the modification shown in Fig. 12, the jacket 40 consists of woven strands of cotton thread or the like. It extends over the end faces of the cartridge and may be applied by a suitable weaving machine.

In Fig. 13, I have illustrated a cartridge having a knitted jacket 41.

In Figs. 14, 15 and 16 there is shown a jacket 42 formed by a thread wound about the cartridge to present a multiplicity of closely set strands. This is what I term a "cord" jacket. The strands are arranged in one or more layers. In the embodiment illustrated, there are two layers positioned over substantially the whole side surface of the cartridge. The thread is wound at a slight angle to the longitudinal axis of the cartridge in this particular instance, but variation may be made in that respect. This cord wrapping may be applied readily to the cartridge by a method and machine set forth respectively in other applications. Where there is more than one layer of strands, those in different layers are arranged at different angles so that the strands of one layer cross those of the next layer, as in the example shown. The free end of the thread may be tied in place in a suitable manner, as by tying it about the electrode.

In all of the forms described, the jacket of textile strands is directly applied to the cartridge, and the former has a snug fit on the latter, the strands preferably being under slight tension and hugging the depolarizing material quite closely. The strands are so closely set as to serve the function of a fabric, whether or not what is technically called a fabric is employed, and the jacket is shaped by its application to the lines of the cartridge so as to follow them closely. The jacket may be readily applied to the cartridge by suitable machines, with a great saving of time and labor as compared to the customary methods now in use.

Various changes in the details may be made without departing from the scope of my invention, as set forth in the claims.

I do not claim herein the method of covering a dry cell cartridge which comprises enveloping the same by direct application of a multiplicity of textile strands under tension, as claimed in my application, Serial No. 393,336, filed July 1, 1920.

What I claim is:

1. A dry cell cartridge having a tubular cover, the axis of which is displaced relatively to the axis of the cartridge whereby the ends of the cover are positioned without the longitudinal axis of the cartridge.

2. A dry cell cartridge having a snugly fitting cover formed of a plurality of separate strands, and means independent of the cartridge for positioning the strands relatively to each other.

3. A dry cell, having a cartridge of depolarizing material, with a smooth snugly conforming self-contained tubular fabric jacket formed directly on the same, said jacket being adapted to retain its form if the cartridge is removed therefrom.

4. A dry cell, having a cartridge of depolarizing material, with a smooth snugly conforming self-contained tubular fabric jacket formed directly on the same, and extending over the ends thereof; said jacket having a tubular form independently of the cartridge.

5. A depolarizing cartridge for dry cells, having a snugly formed braided jacket thereon, said jacket having open but contracted end necks extending longitudinally of the cartridge at the upper and lower portions thereof.

6. In a dry cell, a zinc cup, a carbon pencil therein, a body of depolarizing material surrounding the pencil within the cup, a tubular fabric jacket formed directly on the cartridge and extending over the same at the ends, a body of paste interposed between the jacket and the side wall of the cup, a yielding washer located over the paste and fitting against the top portion of the cartridge jacket, and means above said washer for closing the cell at the top.

7. In a dry cell, a zinc cup, a carbon pencil therein, a cylindrical depolarizing cartridge surrounding the pencil within the cup, a tubular fabric jacket directly applied to the cartridge and open at the upper and lower ends, means at the ends of the cartridge for preventing raveling of the jacket, a body of paste interposed between the side wall of the cup and the side surface of the cartridge, and a closure for the upper end of the cell.

8. In a dry cell, a zinc cup, a carbon pencil therein, a depolarizing cartridge surrounding the pencil within the cup, a tubular braided jacket enclosing the cartridge and having a contracted open lower end neck extending longitudinally of the cartridge, and a body of paste interposed between the side wall of the cup and the side surface of the cartridge.

9. In a dry cell, a zinc cup, a carbon pencil therein, a depolarizing cartridge surrounding the pencil within the cup, a tubular braided jacket enclosing the cartridge and having a contracted open lower end neck extending longitudinally of the cartridge, a body of paste interposed between the side wall of the cup and the side surface of the cartridge, and a centering washer fitting over the bottom of the jacket cartridge to center the same in the bottom of the zinc cup.

10. A dry cell cartridge having a tubular fabric cover thereon with open, but contracted, end necks extending longitudinally of the cartridge.

11. A dry cell cartridge having a tubular fabric cover thereon with an open but contracted end neck extending longitudinally at one end thereof.

12. A dry cell cartridge having a body and a projecting pencil, and a tubular cover for the body, having a contracted open end disposed at one side of the pencil.

13. In a dry cell, a cartridge of depolarizing material, having a snugly conforming jacket consisting of a single layer of crossed textile strands formed directly on the cartridge in contact with the depolarizing material.

In witness whereof, I have hereunto set my hand on the 29th day of June, 1920.

ARTHUR C. JEWETT.